United States Patent
Chang et al.

(10) Patent No.: US 9,519,539 B2
(45) Date of Patent: Dec. 13, 2016

(54) MONITORING DATA ERROR STATUS IN A MEMORY

(71) Applicant: Macronix International Co., Ltd., Hsinchu (TW)

(72) Inventors: Kuen Long Chang, Taipei (TW); Ken Hui Chen, Hsinchu (TW); Su Chueh Lo, Hsinchu (TW); Chia-Feng Cheng, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 42 days.

(21) Appl. No.: 14/612,369

(22) Filed: Feb. 3, 2015

(65) Prior Publication Data
US 2016/0117218 A1 Apr. 28, 2016

Related U.S. Application Data

(60) Provisional application No. 62/068,152, filed on Oct. 24, 2014.

(51) Int. Cl.
*G11C 29/00* (2006.01)
*G06F 11/10* (2006.01)
*G06F 3/06* (2006.01)

(52) U.S. Cl.
CPC .......... *G06F 11/1004* (2013.01); *G06F 3/064* (2013.01); *G06F 3/0619* (2013.01); *G06F 3/0653* (2013.01)

(58) Field of Classification Search
None
See application file for complete search history.

(56) References Cited

U.S. PATENT DOCUMENTS

| | | | |
|---|---|---|---|
| 6,233,717 B1 | 5/2001 | Choi | |
| 7,426,678 B1 * | 9/2008 | Cory | H03M 13/19 714/774 |
| 8,516,343 B2 * | 8/2013 | Flynn | G06F 11/108 714/773 |
| 9,201,735 B1 * | 12/2015 | Rakitzis | G06F 9/48 |
| 2003/0046631 A1 * | 3/2003 | Gappisch | G06F 11/1068 714/763 |
| 2004/0153902 A1 * | 8/2004 | Machado | G06F 11/1068 714/710 |
| 2010/0122146 A1 * | 5/2010 | Nazarian | G06F 11/1072 714/763 |
| 2016/0041861 A1 * | 2/2016 | Chang | G06F 11/073 714/57 |

FOREIGN PATENT DOCUMENTS

TW 436799 B 5/2001

* cited by examiner

*Primary Examiner* — Daniel McMahon
(74) *Attorney, Agent, or Firm* — Finnegan, Henderson, Farabow, Garrett & Dunner LLP

(57) ABSTRACT

A method for outputting data error status of a memory device includes generating data status indication codes indicating error status of data chunks transmitted by a memory controller, and combining the data status indication codes with corresponding data chunks to generate an output signal, and outputting the output signal to a data bus pin.

9 Claims, 4 Drawing Sheets

MONITORING DATA ERROR STATUS IN A MEMORY

CROSS-REFERENCE TO RELATED APPLICATIONS

This application is based upon and claims the benefit of priority from Provisional Application No. 62/068,152, filed on Oct. 24, 2014, the entire contents of which are incorporated herein by reference.

TECHNOLOGY FIELD

The disclosure relates to operation of a memory and, more particularly, to a method and device for monitoring data error status in a memory device.

BACKGROUND

Data transmitted to or from a memory device may be lost or damaged. To mitigate this problem, an error correcting code (ECC) can be added to a piece of data (also referred to as "user data" or "user code") written into a memory array of the memory device. The ECC can be generated by an ECC generator configured in a memory controller that controls the operation of the memory device. Usually, the user data and the corresponding ECC are stored in different portions of the memory array. The portion for storing user data is also referred to as a "normal array," while the portion for storing ECCs is also referred to as an "ECC array."

An ECC can be used to check whether corresponding user data contain any errors when the user data is read or transmitted from the memory device. If a correctable error exists, the ECC can also be used to correct the user data while the user data is being read or transmitted. Depending on the scheme adopted and the number of bits in the ECC, the ECC can correct a certain number of fail bits in the corresponding user data. If the user data contain zero fail bits, they pass the check. If the number of fail bits in the user data is smaller than or equal to a maximum number of fail bits that the ECC can correct, the user data are correctable. But if the number of fail bits in the user data is larger than the maximum number, the user data are uncorrectable. For example, according to a Hamming code scheme, an ECC having eight ECC bits can be added to a chunk of user data containing 128 bits. Such an ECC allows one fail bit among the 128 bits to be corrected.

Conventionally, the error correction is performed inside the memory controller. A user may not know whether a piece of output data initially contains no error or is corrected. That is, the user does not receive and thus cannot check a data error status of data stored in the memory device.

SUMMARY

In accordance with the disclosure, there is provided a method for outputting data error status of a memory device. The method includes generating a data status indication code indicating error status of a data chunk transmitted by a memory controller, combining the data status indication code with the data chunk to generate an output signal, and outputting the output signal to a data bus pin.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Embodiments consistent with the disclosure include method and device for monitoring data error status in a memory device.

Hereinafter, embodiments consistent with the disclosure will be described with reference to the drawings. Wherever possible, the same reference numbers will be used throughout the drawings to refer to the same or like parts.

Figure 1:
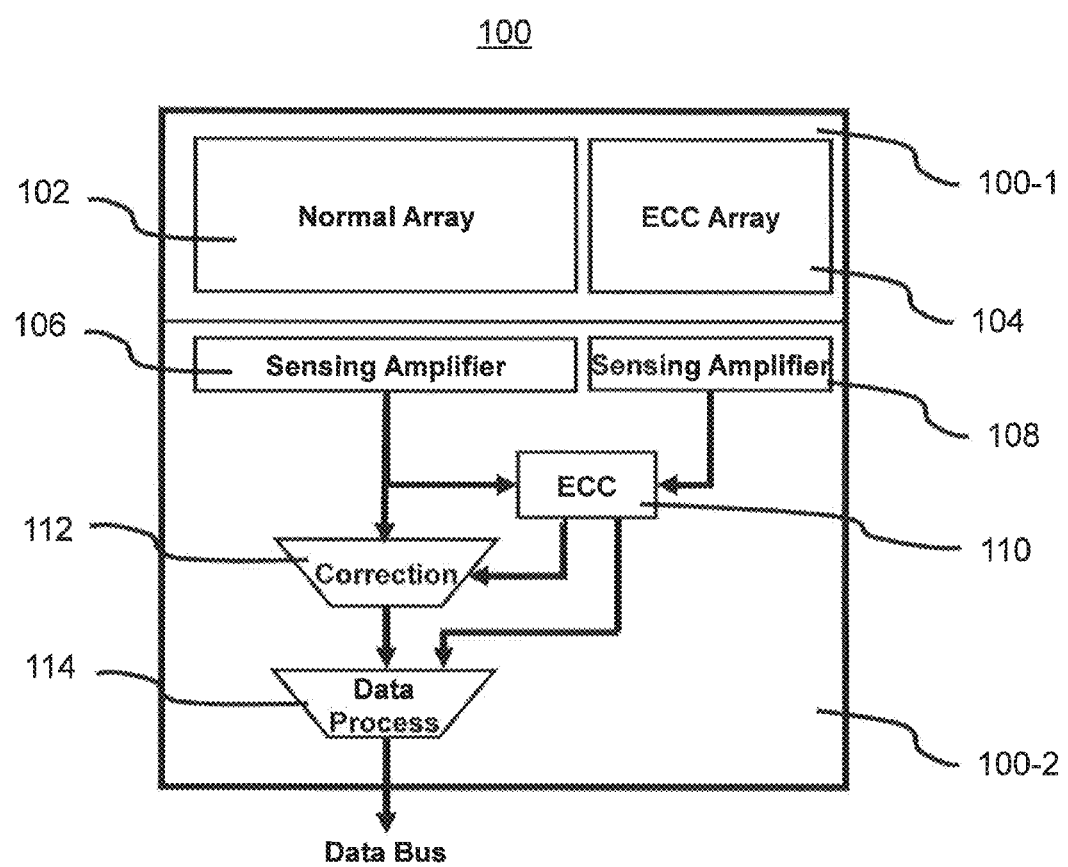
FIG. 1 is a block diagram schematically showing a structure of a memory device according an exemplary embodiment.

FIG. 1 is a block diagram schematically showing a structure of an exemplary memory device 100 consistent with embodiments of the disclosure. The memory device 100 includes a memory array 100-1 configured to save data and a memory controller 100-2 controlling the operation of the memory device 100 such as, for example, reading data from and writing data to the memory array 100-1, and outputting data to outside of the memory device 100, such as to a data bus pin.

As shown in FIG. 1, the memory array 100-1 includes a normal array 102 storing user data and an ECC array 104 storing ECCs.

The memory controller 100-2 includes a first sensing amplifier 106, a second sensing amplifier 108, an error status decoding circuit 110 (labeled as "ECC" in FIG. 1), a correction circuit 112 (labeled as "Correction" in the figure), and a data processing circuit 114 (labeled as "Data Process" in the figure). Consistent with the disclosure, the correction circuit 112 and the data processing circuit 114 may each include, for example, a multiplexer. The first sensing amplifier 106 interacts with the normal array 102 to, for example, read the user data from the normal array 102. The second sensing amplifier 108 interacts with the ECC array 104 to, for example, read the ECCs from the ECC array 104. The first sensing amplifier 106 outputs the acquired user data to the correction circuit 112. Further, the first and second sensing amplifiers 106 and 108 respectively output the acquired user data and ECCs to the error status decoding circuit 110, which checks whether the user data contain any error and, if so, generates information for correcting such error. The error status decoding circuit 110 then outputs this correction information to the correction circuit 112, which uses the correction information to correct the user data received from the first sensing amplifier 106. The corrected user data is then output to the data processing circuit 114 for outputting to, for example, a data bus pin. If the user data read from the normal array 102 by the first sensing amplifier 106 do not contain any error, they are then passed by the correction circuit 112 to the data processing circuit 114 for outputting, and no correction is performed.

Consistent with embodiments of the disclosure, the error status decoding circuit 110 also generates a data status indication code indicating the error status of the corresponding data read from the normal array 102, and outputs the data status indication code to the data processing circuit 114. The data processing circuit 114 combines the data status indication code with its corresponding user data to generate an output signal and outputs the output signal to a data bus pin for outputting to a user interface to present to a user.

Figure 2:
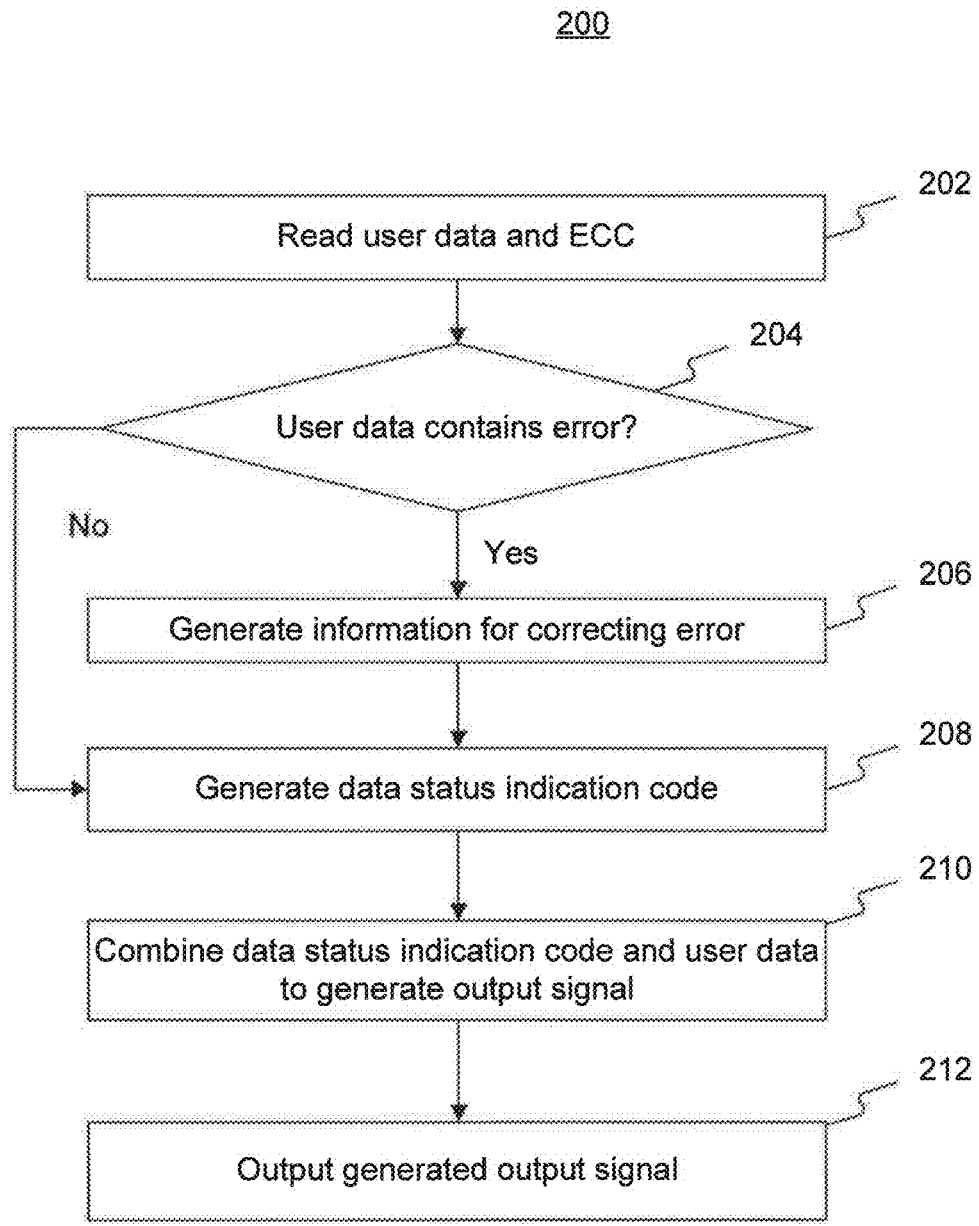
FIG. 2 is a flow chart showing a method according to an exemplary embodiment.

FIG. 2 is a flow chart showing an exemplary method 200 for monitoring data error status in a memory device, such as the memory device 100 shown in FIG. 1. As shown in FIG. 2, at 202, the memory controller 100-2 reads a piece of user data from the normal array 102 and a corresponding ECC from the ECC array 104. More specifically, the first sensing amplifier 106 of the memory controller 100-2 reads the user data and the second sensing amplifier 108 of the memory controller 100-2 reads the corresponding ECC. Such a piece of user data is also referred to as a "data chunk." The data chunk may include, for example, 128 bits of user data. The corresponding ECC may include, for example, eight bits. Further, the first sensing amplifier 106 transfers the read data chunk to the error status decoding circuit 110 and the correction circuit 112. The second sensing amplifier 108 transfers the read ECC to the error status decoding circuit 110.

At 204, the error status decoding circuit 110 checks whether the data chunk contains any error by referring to the ECC. If the data chunk contains error (204—Yes), the error status decoding circuit 110 performs a calculation to generate information for correcting such error (also referred to as "correction information") (206 in FIG. 2) and outputs the correction information to the correction circuit 112. The correction information may include, for example, fail bit address information, which indicates a position of a fail bit in the chunk or an address of the fail bit in the memory array.

After the information for correcting the error is calculated at 206 or if the data chunk does not contain any error as determined at 204 (204—No), the error status decoding circuit 110 generates a data status indication code indicating error status of the data chunk (208 in FIG. 2), and transfers the data status indication code to the data processing circuit 114.

The data status indication code may indicate at least one of a fail bit number, a fail bit location, or a fail bit threshold voltage. Consistent with the disclosure, "fall bit number" refers to the number of fail bits in the data chunk, "fail bit location" refers to a location of a fail bit in the data chunk, and "fail bit threshold voltage" refers to a threshold voltage of a memory cell that stores a fail bit. The data status indication code may include one or more bits. In some embodiments, the data status indication code includes two bits. For example, a code of "00" indicates that the data chunk read from the normal array does not contain any error ("Pass"); a code of "01" indicates that the data chunk read from the normal array contains an error but the error can be corrected ("Correctable"), and the memory controller 100-2 corrects the error and outputs a corrected data chunk; and a code of "10" indicates that the data chunk read from the normal array contains an error that cannot be corrected ("Uncorrectable").

At 210, the data processing circuit 114 combines the data status indication code with the original data chunk (if it contains no error or contains uncorrectable error) or the corrected data chunk (if the original data chunk contains correctable error) output by the correction circuit 112, to generate an output signal.

At 212, the data processing circuit 114 outputs the output signal containing the data status indication code to a data bus pin. The data status indication code is then further transferred to a user interface, such that the user receives information about the data error of the transmitted data chunk. The user interface may, for example, be an interface displayed on a screen.

Consistent with embodiments of the disclosure, the combination of the data status indication code with its corresponding data chunk, i.e., 210 in FIG. 2, is configurable. The data status indication code can be added to the data chunk in various ways, which are discussed in further detail below. Further, memory devices consistent with embodiments of the disclosure, such as the memory device 100 shown in FIG. 1, may include, for example, parallel flash memories or serial flash memories. In the embodiments discussed below, a serial flash memory is used as an example.

Figure 3A:
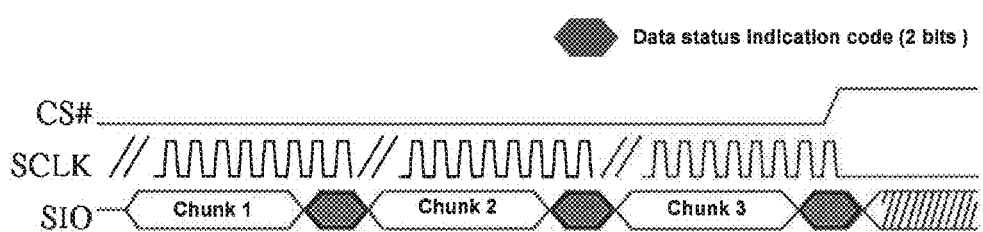
FIGS. 3A and 3B schematically show signal wave forms when outputting data error status according to exemplary embodiments.

FIG. 3A schematically shows signal wave forms for an exemplary serial flash memory consistent with embodiments of the disclosure. In FIG. 3A, CS# designates a "Chip Enable" signal, which controls when the memory is enabled (operation on or of the memory, such as inputting or outputting data, can be performed when the memory is enabled); and SCLK designates a "Serial Clock." Further, SIO designates "Serial Input/Output," which represents, for example, data output by the memory to the data bus pin, i.e., the output signal including the combination of the data status indication code and the data chunk.

In FIG. 3A, the data status indication code and its corresponding data chunk are output during different clock cycles. The period of a plurality of clock cycles during which the data status indication code and its corresponding data chunk are output is also referred to herein as an output period. As shown in FIG. 3A, the output period includes several successive clock cycles of SCLK. In the example shown in FIG. 3A, each data status indication code includes two bits, one of which is output at the next-to-last clock cycle of the output period and the other one of which is output at the last clock cycle of the output period.

Figure 3B:
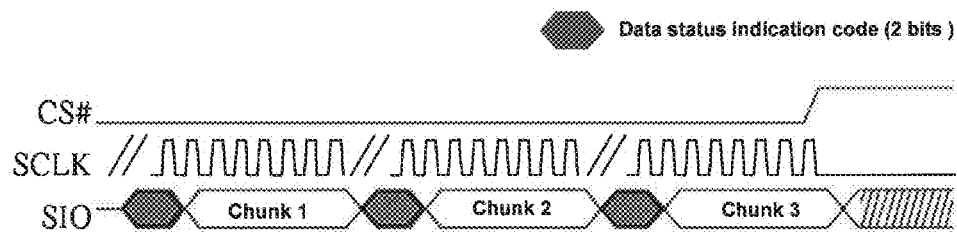

In FIG. 3A, each data status indication code follows its corresponding data chunk, i.e., each data status indication code is output after its corresponding data chunk is output. In some embodiments, the data status indication code can be output before its corresponding data chunk, as shown in FIG. 3B.

Figure 4A:
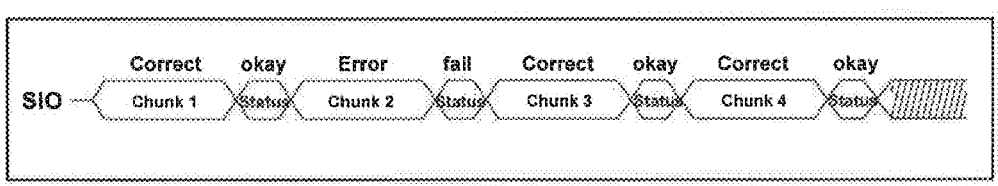
FIGS. 4A and 4B schematically show signal wave forms when outputting data error status according to other exemplary embodiments.
Figure 4B:
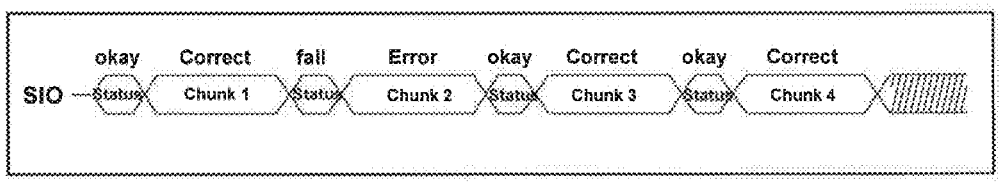

In some embodiments, as described above, the data status indication code indicates the error status of its corresponding data chunk. For example, as shown in FIGS. 4A and 4B, the second data chunk contains uncorrectable error and all other data chunks are correct, i.e., either they are correct when read from the normal array 102 or they contain correctable error when read from the normal array 102 and are corrected in the correction circuit 112. Therefore, the data status indication code corresponding to the second chunk, i.e., the data status indication code after the second data chunk in FIG. 4A or the data status indication code before the second data chunk in FIG. 4B, shows a "fail" status (corresponding to the "Uncorrectable" status discussed above) and the data status indication codes corresponding to other data chunks show an "okay" status (corresponding to the "Pass" or "Correctable" status discussed above).

Figure 5:
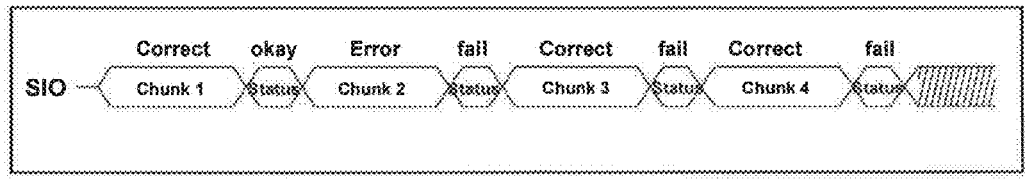
FIG. 5 schematically shows signal wave forms when outputting data error status according to a further exemplary embodiment.

In some embodiments, a data status indication code may not indicate the error status of its corresponding data chunk, but instead indicates an accumulated error status of several data chunks being read. In such embodiments, after a first data status indication code corresponding to a first data chunk is generated, the first data status indication code is checked to determine whether it shows a "fail" or an "okay" status. If the first data status indication code shows a "fail" status, a second data status indication code corresponding to a second data chunk that is to be output after the first data chunk will be designated a "fail" status, no matter whether the second data chunk is correct or contains error. If the first data status indication code shows an "okay" status, the second data status indication code will indicate the actual error status of the second data chunk. For example, as shown in FIG. 5, the second data chunk contains error and all other data chunks are correct. However, besides the data status indication code immediately following the second data chunk, each of the other data status indication codes output for data chunks after the second data chunk also shows a "fail" status, even though the data chunk corresponding thereto does not contain error. With the accumulated error status, the user does not need to monitor the data status indication codes all the time, but can instead check the status after several chunks. When the user queries the error status and receives a data status indication code showing a "fail" status, the user knows a data chunk containing error has previously been output and can stop the operation of the memory device. For example, the user can stop the output of the data.

Figure 6A:
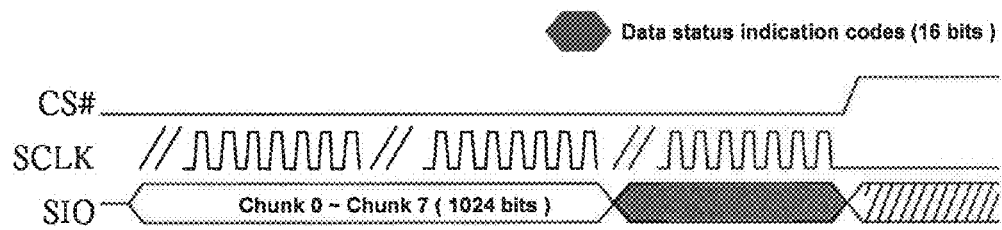
FIGS. 6A and 6B schematically show signal wave forms when outputting data error status according to other exemplary embodiments.
Figure 6B:
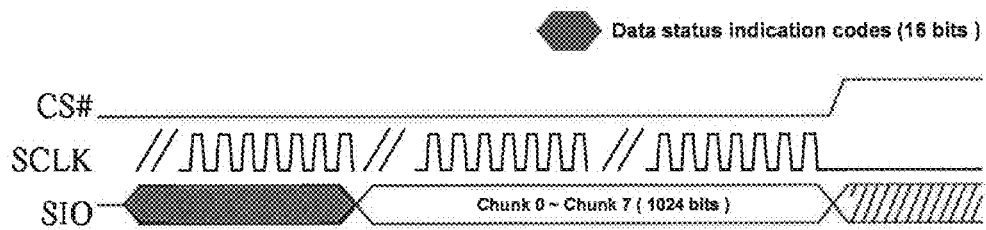

In the embodiments described above in regard to FIGS. 3A-5, the data status indication code and its corresponding data chunk are output successively. But they do not need to be next to each other. FIGS. 6A and 6B show examples in which several data status indication codes are output successively. The collection of these data status indication codes may also be referred to herein as a status chunk. In the examples shown in FIGS. 6A and 6B, eight data chunks are successively output, followed by a status chunk containing eight data status indication codes, each having two bits and corresponding to one of eight data chunks, output successively, so that the status chunk contains a total of sixteen bits. Table I below shows an example of the correspondence between the bits (also referred to herein as status bits) and the data chunks.

In the example shown in Table I, status bits 15 and 14 correspond to data chunk 0, status bits 13 and 12 correspond to data chunk 1, and so on. The status chunk can be output immediately after the corresponding eight data chunks as shown in FIG. 6A, or can be output immediately before the corresponding eight data chunks as shown in FIG. 6B.

The above-discussed embodiments are described in the cases of memory devices. Methods consistent with the disclosure may also be applied to other storage devices, such as hard disks. Similarly, devices consistent with the disclosure may also include other storage devices, such as hard disks, that are configured to implement methods consistent with the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for outputting data error status of a memory device, comprising:
   generating, by a memory controller, a first data status indication code indicating error status of a first data chunk transmitted by the memory controller;
   generating, by the memory controller, a second data status indication code indicating error status of a second data chunk;
   combining, by the memory controller, the first data status indication code and the second data status indication code with the first data chunk and the second data chunk to generate an output signal, including:
      arranging the second data chunk immediately after the first data chunk; and
      arranging the second data status indication code immediately after the first data status indication code; and
   outputting, by the memory controller, the output signal to a data bus pin.

2. A method for outputting data error status of a memory device, comprising:
   generating, by a memory controller, a first data status indication code indicating error status of a first data chunk;
   determining, by the memory controller, whether the first data status indication code indicates a fail status;
      if so, generating a second data status indication code indicating the fail status, the second data status indication code being output immediately before or after a second data chunk to be output after the first data chunk; or
      if not, generating the second data status indication code indicating error status of the second data chunk;
   combining, by the memory controller, the first data status indication code and the second data status indication code with the first data chunk and the second data chunk to generate an output signal; and
   outputting, by the memory controller, the output signal to a data bus pin.

TABLE I

| Status bit [15:14] | Status bit [13:12] | Status bit [11:10] | Status bit [9:8] | Status bit [7:6] | Status bit [5:4] | Status bit [3:2] | Status bit [1:0] |
| --- | --- | --- | --- | --- | --- | --- | --- |
| Chunk 0 | Chunk 1 | Chunk 2 | Chunk 3 | Chunk 4 | Chunk 5 | Chunk 6 | Chunk 7 |

3. The method according to claim 1, further comprising:
arranging the first data status indication code and the second data status indication code after the second data chunk.

4. The method according to claim 1, further comprising:
arranging the first data status indication code and the second data status indication code before the first data chunk.

5. The method according to claim 1, wherein generating the first data status indication code includes generating a code indicating at least one of:
- a number of fail bits in the first data chunk,
- a location of a fail bit in the first data chunk, or
- a threshold voltage of a memory cell in the memory device that stores the fail bit.

6. The method according to claim 3, wherein outputting the output signal includes outputting the first data status indication code and the second data status indication code after outputting the first data chunk and the second data chunk.

7. The method according to claim 6, wherein the memory device includes a serial flash memory and each of the first data status indication code and the second data status indication code includes two bits;
- outputting the output signal includes outputting the first data chunk, the second data chunk, the first data status indication code, and the second data status indication code in a plurality of clock cycles, including:
  - outputting a first one of the two bits of the first data status indication code during a fourth-to-last clock cycle of the plurality of clock cycles;
  - outputting a second one of the two bits of the first data status indication code during a third-to-last clock cycle of the plurality of clock cycles;
  - outputting a first one of the two bits of the second data status indication code during a next-to-last clock cycle of the plurality of clock cycles; and
  - outputting a second one of the two bits of the second data status indication code during a last clock cycle of the plurality of clock cycles.

8. The method according to claim 4, wherein outputting the output signal includes outputting the first data status indication code and the second data status indication code before outputting the first data chunk and the second data chunk.

9. The method according to claim 8, wherein the memory device includes a serial flash memory and each of the first data status indication code and the second data status indication code includes two bits;
- outputting the output signal includes outputting the first data chunk, the second data chunk, the first data status indication code, and the second data status indication code in a plurality of clock cycles, including:
  - outputting a first one of the two bits of the first data status indication code during a first clock cycle of the plurality of clock cycles;
  - outputting a second one of the two bits of the first data status indication code during a second clock cycle of the plurality of clock cycles;
  - outputting a first one of the two bits of the second data status indication code during a third clock cycle of the plurality of clock cycles; and
  - outputting a second one of the two bits of the second data status indication code during a fourth clock cycle of the plurality of clock cycles.

* * * * *